United States Patent
Azulai et al.

(10) Patent No.: US 11,948,382 B2
(45) Date of Patent: Apr. 2, 2024

(54) SYNTHESIZING HARD-NEGATIVE TEXT TRAINING DATA

(71) Applicant: International Business Machines Corporation, Armonk, NY (US)

(72) Inventors: Ophir Azulai, Tivon (IL); Udi Barzelay, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 17/127,918

(22) Filed: Dec. 18, 2020

(65) Prior Publication Data

US 2022/0198186 A1  Jun. 23, 2022

(51) Int. Cl.
| | |
|---|---|
| G06V 30/413 | (2022.01) |
| G06F 18/21 | (2023.01) |
| G06F 18/211 | (2023.01) |
| G06F 18/241 | (2023.01) |
| G06F 40/166 | (2020.01) |
| G06N 20/00 | (2019.01) |
| G06V 30/19 | (2022.01) |

(52) U.S. Cl.
CPC .......... *G06V 30/413* (2022.01); *G06F 18/211* (2023.01); *G06F 18/2163* (2023.01); *G06F 18/241* (2023.01); *G06F 40/166* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 2018/0261213 A1 | 9/2018 | Arik | |
| 2019/0108228 A1* | 4/2019 | Zeng | G06F 16/24522 |
| 2019/0130221 A1 | 5/2019 | Bose | |
| 2019/0130231 A1* | 5/2019 | Liu | G06N 3/045 |
| 2020/0162412 A1* | 5/2020 | Mei | H04L 51/212 |
| 2020/0387755 A1* | 12/2020 | Hagen | G06V 10/7747 |
| 2021/0136514 A1* | 5/2021 | Shaposhnikov | G06N 5/01 |

FOREIGN PATENT DOCUMENTS

| | | | | |
|---|---|---|---|---|
| CN | 111709406 A | | 9/2020 | |
| CN | 112395198 A | * | 2/2021 | .......... G06F 11/3624 |
| CN | 112464957 A | * | 3/2021 | |
| WO | WO-2021123083 A1 | * | 6/2021 | ............. G06N 3/045 |

* cited by examiner

*Primary Examiner* — Mohammed Rachedine
(74) *Attorney, Agent, or Firm* — Kristofer Haggerty

(57) ABSTRACT

A method for synthesizing negative training data associated with training models to detect text within documents and images. The method includes one or more computer processors receiving a set of dictates associated with generating one or more negative training datasets for training a set of models to classify a plurality of features found within a data source. The method further includes identifying a set of rules related to generating negative training data to detect text based on the received set of dictates. The method further includes compiling one or more arrays of elements of hard-negative training data into a negative training data dataset based on the identified set of rules and one or more dictates. The method further includes determining metadata corresponding an array of elements of hard-negative training data.

14 Claims, 5 Drawing Sheets

SYNTHESIZING HARD-NEGATIVE TEXT TRAINING DATA

BACKGROUND OF THE INVENTION

The present invention relates generally to the field of machine learning, and more particularly to generating training sets for text detection.

Optical character recognition (OCR) of text and other glyphs that include or describe information within documents and images has evolved from utilizing fixed models to a process that can utilize cognitive techniques and machine learning algorithms. Machine learning (ML) utilizes computer algorithms and models that automatically improve through experience, such as training and/or observations associated with known or curated content. With regard to text detection, an observation (e.g., text within an image) can be represented in many ways such as a vector of intensity values per pixel, or in a more abstract way as a set of edges, regions of particular shape, etc. ML algorithms may be supervised or unsupervised; and include applications, such as pattern analysis (unsupervised) and classification (supervised). One implementation of ML to detect text utilizes neural networks.

Neural networks (NNs) are computing systems inspired by biological neural networks. NNs are not simply algorithms, but rather a framework for many different machine learning algorithms to work together and process complex data inputs. Such systems learn to perform tasks by considering examples, generally without being programmed with any task-specific rules. For example, in character/text detection, NNs learn to identify text of a language (e.g., glyphs, characters, symbols, punctuation, etc.) within a document, image, or other information source from other elements or artifacts by analyzing examples correctly labeled as true/positive or false/negative (e.g., text or not text) and using the results to identify text in other images. In this example, a NN classifies elements within an information source as text or not-text without any prior knowledge about text. Instead, NNs can automatically generate identifying characteristics based on training sets of data (i.e., positive and negative examples).

SUMMARY

According to an aspect of the present invention, there is a method, computer program product, and/or system for synthesizing negative training data associated with training models to detect text within documents and images. The method includes at least one computer processor receiving a set of dictates associated with generating one or more negative training datasets for training a set of models to classify a plurality of features found within a data source. The method further includes at least one computer processor identifying a set of rules related to generating negative training data to detect text based on the received set of dictates. The method further includes at least one computer processor compiling one or more arrays of elements of hard-negative training data into a negative training data dataset based on the identified set of rules and one or more dictates. The method further includes at least one computer processor determining metadata corresponding an array of elements of hard-negative training data.

DETAILED DESCRIPTION

Figure 1:
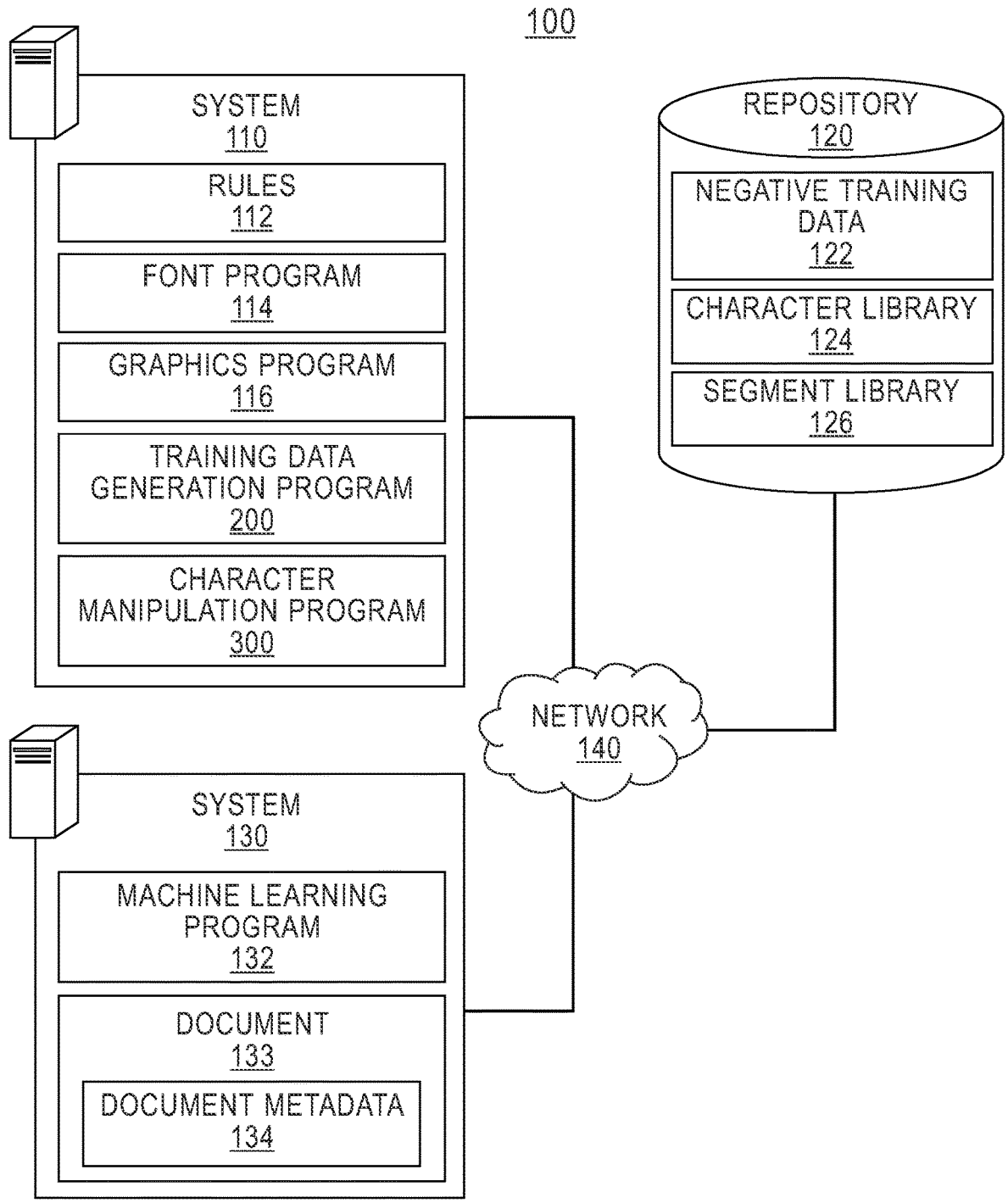
FIG. 1 illustrates a networked site environment, in accordance with an embodiment of the present invention.

Embodiments of the present invention recognize that various computerized methods are utilized to detect (i.e., recognize) and identify text found within a plurality of differing sources, such as electronic documents, scans of physical documents, images of physical documents, pictures, videos, on-line content, etc. Embodiments of the present invention recognize that text can be depicted utilizing a plurality of fonts or typefaces, character sizes and weights, positioned in differing orientations, and/or is associated with one or more languages.

However, embodiments of the present invention also recognize that based on the source of text, such as a scan of a document as opposed to a word processor file version of a document, the text source may be "noisy." A noisy text source, such as a document can include artifacts and effects that distort or damage actual text and also create noise (e.g., groups of pixels) that can be erroneously interpreted as text. For example, an image of a page of a historic manuscript may include text-like artifacts related to damage to the manuscript, defects within the substrate of the manuscript, debris between and/or on surfaces of device imaging the manuscript, printing errors, etc. Whereas, text within a file generated by a word processor would lack noise.

Embodiments of the present invention also recognize that text detection models, such as models associated with machine learning and/or neural networks can generate false-positive text detections by erroneously identifying and classifying noise within a document or image as text. Embodiments of the present invention recognize that a large quantity of noisy documents (e.g., training data) with known artifacts, elements, and/or features classified as non-text are required to improve the robustness of models that detect text within "noisy" documents. Further, embodiments of the present invention recognize that manually curating the results of text detections within a plurality of noisy documents and reclassify artifacts/elements initially classified as text as non-next (i.e., creating hard-negative training data) is impractical.

Embodiments of the present invention recognize that text detection training datasets are not available for simulating noisy documents. Embodiments of the present invention further recognize that methods for automatically generating hard-negative training datasets lack features for simulating noise that can resemble text. Embodiments of the present invention recognize that some training data generators utilize features of natural scenes as hard-negative examples.

Various embodiments of the present invention automatically generate hard-negative training datasets by modifying characters classified as text (i.e., positive training data). As used herein, text and characters can be used interchangeably. Text includes glyphs, characters, symbols, punctuation, ligatures, etc. Text/characters may be further associated with one or more languages, because some text, and/or fonts are specific to a subset of human languages.

Some embodiments of the present invention simulate noisy data (e.g., errors, artifacts, distortions, etc.) by applying a plurality of effects to a selection of characters to generate elements of hard-negative training data (i.e., R-negative tiles). Embodiments of the present invention can apply character-modifying effects randomly, based on a set of rules, or a combination thereof. Embodiments of the present invention generate hard-negative text training datasets by compiling arrays or grids of hard-negative data elements.

Other embodiments of the present invention generate hard-negative training data for text detection based on more granular rules, dictates, and/or criteria. In some cases, a set of hard-negative text training data can be further classified by various identifiers, such as language and/or font. Embodiments of the present invention refer to data elements (i.e., examples) and/or noise (e.g., groups of pixels) within a document that a model could detect as text but are classified as not-text based on various criteria as hard-negative data (e.g., false or negative data). Embodiments of the present invention can utilize criteria, such as text of a language different from the text of the language(s) that a model is trained to detect, text in an orientation and/or mirror axis different from an orientation and/or mirror axis associated with a model, a segment of a character, a character missing more than a threshold area or number of pixels, etc., in association with classifying an element or simulated noise as hard-negative training data.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating networked-computing environment 100, in accordance with embodiments of the present invention. In one embodiment, networked-computing environment 100 includes system 110, repository 120, and system 130, all interconnected over network 140.

System 110, repository 120, and system 130 may be laptop computers, tablet computers, personal computers, desktop computers, or any programmable computer systems known in the art. In certain embodiments, system 110, repository 120, and system 130 represents a computer system utilizing clustered computers and components (e.g., database server computers, application server computers, etc.) that act as a single pool of seamless resources when accessed through network 140, as is common in data centers and with cloud-computing applications. In general, system 110, repository 120, and system 130 are representative of any programmable electronic device or combination of programmable electronic devices capable of executing machine readable program instructions and communicating via network 140. System 110, repository 120, and system 130 may include components, as depicted and described in further detail with respect to FIG. 5, in accordance with embodiments of the present invention.

System 110 includes rules 112, font program 114, graphics program 116, training data generation program 200, character manipulation program 300, and a plurality of other programs and data (not shown). Examples of other programs and data included in system 110 may include a database management/query program, a file management system, a web browser, an image viewing program, a graphics viewing program, a user interface, a communication program, etc.

Rules 112 includes a plurality of sets of rules utilized by training data generation program 200 and/or character manipulation program 300. A set of rules may include one or more dictates, a plurality of steps, policies, and/or criteria related to generating a hard-negative training tile. In some scenarios, a user creates one or more set of rules stored within rules 112. In other scenarios, system 110 automatically generates one or more sets of rules based on data stored within repository 120 and information received from system 130, such as utilizing machine learning program 132 to generate and/or train one or more text detections models for another language or in response to a release of a one or more newly created fonts. In another embodiment, rules 112 also includes rules related to generating hard-negative training data from among segments of characters stored within segment library 126.

In various embodiments, rules 112 includes a plurality of pre-defined sets of rules related to generating hard-negative training data (i.e., R-negative tiles) from characters based on specific inputs and/or generalized constraints, such as outputting elements of training data as bitmaps. In one example, rules 112 includes policies or information associated with character-modifying effects, such as modifying a size (e.g., a scale factor, a zoom percentage, a magnification) and/or a font of a character, dividing (e.g., splitting) a character or cropped areas based on edges (i.e., boundaries) of sub-array segments, positive and/or negative languages dictates related to selecting characters, determining randomization factors utilized to generating hard-negative data elements, logical conditions associated with selecting a rule, executing steps of a rule, determining a priority among rules, etc. In another example, rules 112 also includes other policies related to applying other character-modifying effects, such as blurring a character; cropping a portion from a character or a portion (e.g., features) of a character within segment, translating, rotating, and/or mirroring a character within a tile; retaining and modifying the cropped portions of the; mirroring a segment; translating one or more segments within a tile, etc.

Still referring to rules 112, in some embodiments rules 112 can also include dictates, such as a determining size/area (e.g., x by y pixels) related to an element (i.e., tile) of training data; determining a size and/or shape of a segment within a tile; determining a size and a shape associated with an area to crop; partitioning tiles into sub-arrays of differing integer number of segments; rearranging a group of segments within a tile; an order to apply a group of character-modifying effects; replacing one or more segment of a character within a tile from segment library 126 or a blank segment (e.g., 100% of pixels on or off); etc. Rules 112 can also include other dictates relate to the number of instances of a character that modified to create hard-negative examples of the character based on multiple sets of rules. For example, one set of rules may dictate a tile is partitioned into a sub-array of four segments, and three to five instances of each character of a given language used to create a hard-negative training dataset.

In one embodiment, font program 114 is a program that modifies, generates, and/or renders a character, glyph, symbol, etc., based on inputs associated with a size, a weight, and/or a typeface. Font program 114 can also generate and render a character based on additional inputs or qualifiers, such as bold, italic, subscript, superscript, combine into ligatures, etc. In some embodiments, font program 114 also includes a plurality of descriptions of digital fonts (e.g., typeface and style description) utilized to create or render a character. In various embodiments, font program 114 can create and/or render a character based on a dictated resolution, such as 300 pixels/centimeter; and/or a one or more formats, such as bitmap, vector, and stroke.

Graphics program 116 represents a suite of functions and programs that automatically edit, modify, and/or dividing a character within a training tile based on one or more rules and/or included within rules 112 and/or dictates received from character manipulation program 300. In some embodiments, graphics program 116 modifies a character obtained from character library 124. In another embodiment, graphics program 116 modifies a character generated by font program 114. In a further embodiment, graphics program 116 creates a hard-negative training tile from group of segments selected from segment library 126.

In various embodiments, graphics program 116 applies one or more effects (previously discussed with respect to rules 112) to modify a character or a segment, such as cropping one or more portions from a character, rotating a character about a point or axis, partitioning a character within a tile into a group of segments, etc. In addition, graphics program 116 can generate a segment of a tile by rendering a cropped portion of a character within a blank segment. Modifications and adjustments may be applied in a dictated order or in a random order.

Graphics program 116 can also grow or shrink a character, segment, or a cropped portion of the character (e.g., a feature) to a dictated or a random size. In one example, if a portion of a modified character does not fit within a dictated tile size or a respective segment of the partitioned tile, then graphics program 116 removes (e.g., trims) one or more groups of pixels from the modified character that extend beyond the boundaries of the respective segment. In another example, graphics program 116 can adds blank pixels to fill unfilled areas within the tile based on one or more effects or modifications. Graphics program 116 can also delete, move, shift, and/or rearrange one or more segments within a tile.

Training data generation program 200 is a program for generating hard-negative data (e.g., example) for training text detection models. In various embodiments, training data generation program 200 interfaces with character manipulation program 300 to generate a plurality of tiles (e.g., elements) of hard-negative training data. In some embodiments, training data generation program 200 compiles a group of tiles into an array, grid, and/or a negative training dataset. In an embodiment, training data generation program 200 determines to generate one or more sets of hard-negative training data based on user inputs, such as a set of dictates and/or one or more set of rules within rules 112. For example, in response identifying a release of one or more new typefaces or fonts, a user dictates that training data generation program 200 generates additional negative training datasets based on modified characters (e.g., alphanumericals, symbols, punctuation, etc.) associated with each of the new typefaces and further associated with a language, such as German and French.

In another embodiment, training data generation program 200 determines to generate one or more sets of hard-negative training data based on information received from system 130 and/or machine learning program 132. In one example, training data generation program 200 determines to generate hard-negative training data for text detections models associated with character-based languages as opposed to alphabet-based languages. In another example, if machine learning program 132 determines that negative training data 122 includes hard-negative training data that includes kanji characters and/or other logograms, then machine learning program 132 instructs training data generation program 200 to generate additional negative training datasets that exclude unmodified kanji characters and logograms.

Character manipulation program 300 is a program that generates elements of hard-negative training data based on information received from training data generation program 200 and utilizing one or more sets of rules included within rules 112. In some embodiments, multiple instances of character manipulation program 300 can execute concurrently to generate elements of negative training based on differing constraints and/or rules. In various embodiments, character manipulation program 300 utilizes graphics program 116 to modify copies of characters included within character library 124 as a basis of tiles of hard-negative training data. In another embodiment, character manipulation program 300 can also utilize font program 114 to create a copy of a character based on a dictated size and/or font prior to modifying the character to generate a hard-negative data element. Various aspects of character manipulation program 300 are discussed in further detail with respect to FIG. 3.

Repository 120 includes negative training data 122, character library 124, segment library 126, and other programs and data (not shown). Examples of other programs and data included in repository 120 may include one or more databases; a database management system; a file management system; a web browser; metadata and/or other contextual information respectively associated with the training datasets stored within negative training data 122, characters stored within character library 124, and/or segments stored within segment library 126; a user interface, etc. In some embodiments, repository 120 also includes a plurality of examples of positive training data, such as a plurality of unmodified characters from among differing languages and/or alphabets (not shown).

In one embodiment, repository 120 is representative of one or more network-accessible storage systems and/or a plurality of storage devices. In another embodiment, repository 120 is included within system 110. In other embodiments, an instance of repository 120 is included within an instance of system 130 that utilizes given instances of negative training data 122.

Negative training data 122 includes a plurality of instances of hard-negative training data. In an embodiment, negative training data 122 includes a plurality of individual tiles of hard-negative training data, a plurality of arrays (e.g., grids of tiles) of hard-negative training data, and/or one or more documents comprised exclusively of arrays of hard-negative training data. In a further embodiment, negative training data 122 also includes a plurality of documents of mixed content (e.g., combinations of positive and negative training data) and corresponding metadata that indicates the locations of the instance of hard-negative data within a document.

Character library 124 includes a plurality of text characters associated with one or more alphabets and/or languages. In some embodiments, characters within character library 124 are further identified with other qualifiers and/or characteristics, such as a language, a font, a typeface, a size, etc. Characters within character library 124 may also be stored in a format, such as bitmap to facilitate modifications by graphics program 116. In another embodiment, character library 124 is constrained to include base-sets of text characters for a given language. Characters of specific fonts, styles, and/or sizes are dynamically generated and rendered by font program 114. In an embodiment, character library 124 can be updated with characters generated and rendered by font program 114.

Segment library 126 includes a plurality segments generated in response to graphics program 116 partitioning a training data element within a tile. In one embodiment segment library 126 includes a plurality of segments produced by one or more aspects of character manipulation program 300 generating one or more hard-negative training data tiles. In some scenarios, segment library 126 receives a constrained quantity (e.g., percentage) of the total number of segments produced by character manipulation program 300 generating a plurality of hard-negative data elements. In an embodiment, because a segment of a tile is an incomplete character, any segment within segment library 126 is classified as a hard-negative data element.

System 130 includes machine learning program 132, documents 133, and other programs and data (not shown). Examples of other programs and data included in system 130 may include a neural network program, a classification program, a plurality of models utilized by machine learning program 132, a web browser, metadata and/or other contextual information respectively associated with the training datasets stored within repository 120 for training one or more of the models within system 130, a user interface, etc.

In one embodiment, machine learning program 132 includes a plurality of algorithms and models utilized to detect text from other artifacts within noisy sources of information, such a images, document scans, streaming videos, etc. In various embodiments, machine learning program 132 can represent other model-driven technologies utilized to detect text based on training models utilizing a plurality of positive and negative training datasets, such as artificial intelligence programs, cognitive programs, one or more types of neural networks, etc.

In another embodiment, if machine learning program 132 identifies one or more documents of documents 133 as potentially including features not previously as modeled and/or classified as text or not-text based information included within document metadata 134, then machine learning program 132 executes training data generation program 200 to generate negative training data related to the one or more identified documents. In some embodiments, if machine learning program 132 determines that one or more text detection models does not improve or generates classification errors above a threshold value based on the training data within negative training data 122, then machine learning program 132 instructs training data generation program 200 to create additional negative training data based on one or more dictates.

Documents 133 includes a plurality of items that include at least some text, such as images, documents, files, etc. In various embodiments, documents 133 also includes document metadata 134. Document metadata 134 represents instance of metadata information respectively associated with items within documents 133. In an embodiment, a subset of documents 133 are identified within document metadata 134 as non-noisy documents, noisy documents, and/or other information sources that include text and non-text artifacts. Examples of metadata information respectively associated with an item within documents 133 may include a list of languages associated with the item, a source of the item, a file format, areas classified as text or not-text are identified within an item, one or more locations that have been analyzed to detect text, and/or locations that require a text detection analysis. Document metadata 134 may further include information related to an item, such as fonts used within the item; a direction to parse (e.g., read, analyze) the item, such as left-to-right, by row as opposed to by column; a varying text orientation, such as a circle or spiral, etc.

Network 140 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 140 can be any combination of connections and protocols that will support communications between system 110, repository 120, system 130, and/or the Internet, in accordance with embodiments of the present invention. In various embodiments, network 140 operates locally via wired, wireless, or optical connections and can be any combination of connections and protocols (e.g., personal area network (PAN), Bluetooth®, near field communication (NFC), laser, infrared, ultrasonic, etc.).

Figure 2:
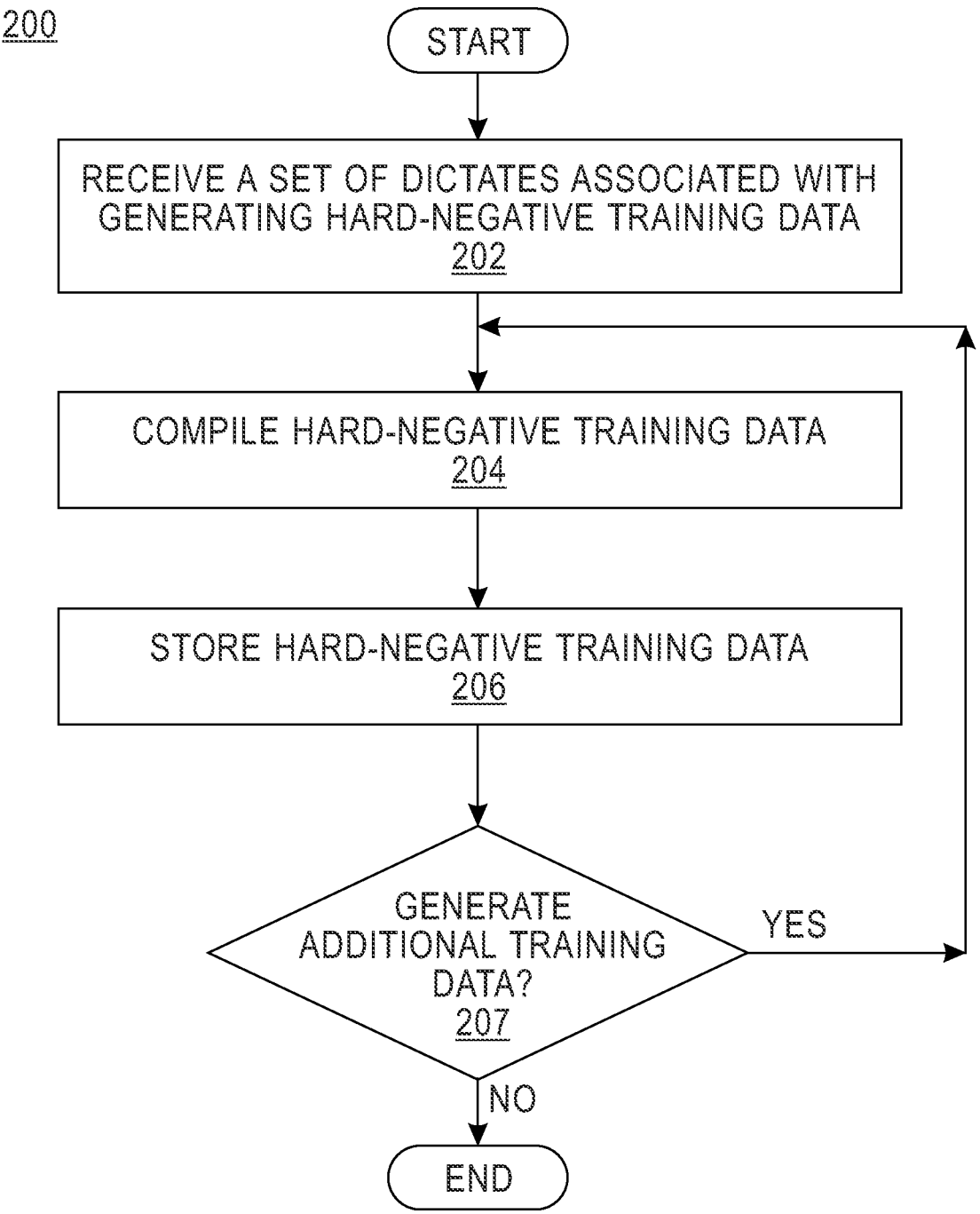
FIG. 2 depicts a flowchart of steps of a training data generation program, in accordance with an embodiment of the present invention.

FIG. 2 is a flowchart depicting operational steps for training data generation program 200, a program for generating hard-negative training data for text detection, in accordance with embodiments of the present invention. In some embodiments, training data generation program 200 can concurrently execute and interface with a plurality of instances of character manipulation program 300.

In step 202, training data generation program 200 receives a set of dictates associated with generating hard-negative training data. Dictates may include languages utilized for character selection; an array size and/or a number of tiles of hard-negative training data to generate; a specific set of rules to utilize to generate hard-negative training data; a train element resolution dictate, such as 600 dots/inch or an integer number of pixels; and/or other dictates previously discussed above. In one embodiment, training data generation program 200 receives a set of dictates associated with generating hard-negative training data from a user. In another embodiment, training data generation program 200 receives a set of dictates associated with generating hard-negative training data from machine learning program 132. In some embodiments, training data generation program 200 identifies further dictates within a set of rules included within rules 112 related to generating hard-negative training data.

In step 204, training data generation program 200 compiles hard-negative training data. In various embodiments, training data generation program 200 executes character manipulation program 300 to generate a plurality of hard-negative training data tiles based on one or more dictates included within the received set of dictates. Training data generation program 200 communicates one or more dictates and/or identifies one or more sets of rules within rules 112 that character manipulation program 300 utilizes to generate elements of hard-negative training data. In some scenarios, training data generation program 200 executes concurrent instances of character manipulation program 300 to generate hard-negative training data tiles based on differing dictates, such as generating hard-negative training data for each language of a dictated set of languages. In another embodiment, training data generation program 200 utilizes graphics program 116 to create a plurality of hard-negative training data tiles from among copies of segments included within segment library 126.

In one embodiment, training data generation program 200 compiles a plurality of hard-negative training data tiles (e.g., elements) into one or more arrays based on the received set of dictates. In one scenario, training data generation program 200 compiles a set (e.g., one or more arrays and/or individual tiles) of hard-negative training data received from character manipulation program 300. In another scenario, training data generation program 200 compiles a set of hard-negative training data by randomly selecting hard-negative tiles from multiple sources, such as negative training data 122 and/or create by graphics program 116 that meet one or more of the received dictates, such as a set of languages to excluded and/or fonts to include.

Still referring to step 204, in a further embodiment, training data generation program 200 further compiles a plurality of arrays of training data into a document. In one scenario, training data generation program 200 creates a document consisting of 100% hard-negative arrays and/or tiles. In another scenarios, training data generation program 200 can create documents that includes a combination of positive and negative training data arrays, and the metadata corresponding to the document includes the locations of the arrays of each type of training data. In some scenarios, training data generation program 200 modifies a non-noisy document included within documents 133 to include hard-negative training data arrays and/or tiles. Training data generation program 200 also updates document metadata 134 corresponding to the modified document to identify the locations of the arrays and/or tile of hard-negative training data included within the modified document and other metadata related to the included arrays.

In step 206, training data generation program 200 stores hard-negative training data. In one embodiment, training data generation program 200 stores the compiled hard-negative training data and related metadata within negative training data 122 included within repository 120. In some embodiments, training data generation program 200 determines to also store individual tiles of hard-negative training data based on information included within rules 112 and/or a received dictate. In other embodiments, training data generation program 200 also determines to store a percentage or a random number of segments that are included among the plurality of generated plurality of hard-negative training data tiles within segment library 126. In various embodiment, training data generation program 200 also updates metadata corresponding to a tile or an array included within negative training data 122 and/or related to segments within segment library 126, such as a program that requested the negative training data, dictates utilized to generate the negative training data, models that utilize the negative training data, etc.

In decision step 207, training data generation program 200 determines whether to generate additional training data. In one embodiment, training data generation program 200 determines to generate additional training data based on one or more received dictates, such as the number of tiles within an array of training data. For example, if system 110 lacks sufficient resources to execute multiple instances of character manipulation program 300, then training data generation program 200 loops until character manipulation program 300 generates sufficient hard-negative data to satisfy a received set of dictates. In another embodiment, training data generation program 200 determines to generate additional training data based receiving a response from machine learning program 132 that negative training data 122 lacks sufficient negative training data to train one or more text detection models.

Responsive to determining to generate additional training data (Yes branch, decision step 207), training data generation program 200 loops to step 204 to instruct character manipulation program 300 to generate additional training data based on one or more other dictates and/or another set of rules.

Referring to decision step 207, responsive to determining not to generate additional training data (No branch, decision step 207), training data generation program 200 terminates.

Figure 3:
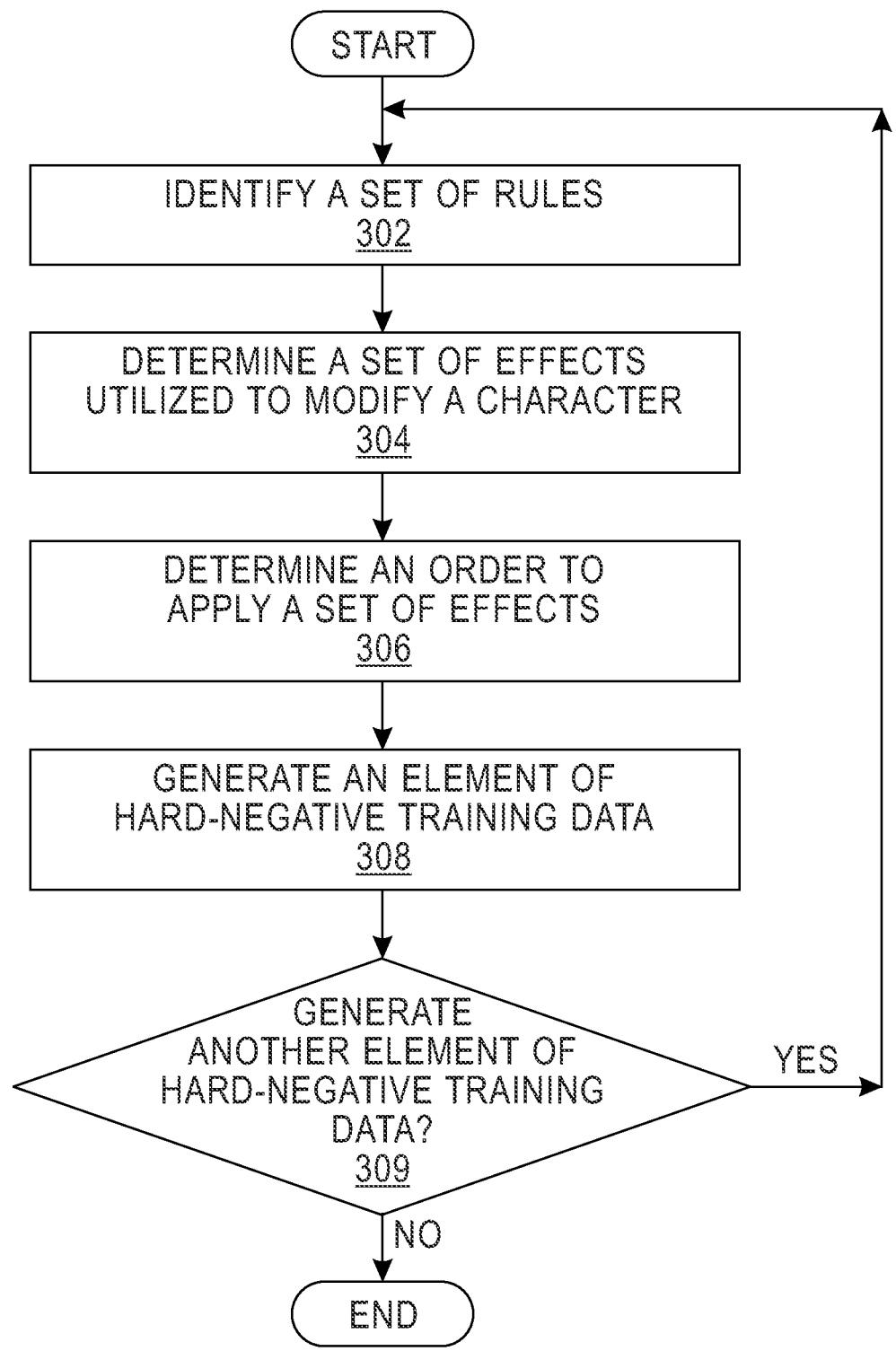
FIG. 3 depicts a flowchart of steps of a character manipulation program, in accordance with an embodiment of the present invention.

FIG. 3 is a flowchart depicting operational steps for character manipulation program 300, a program for generating elements of hard-negative training data for text detection, in accordance with embodiments of the present invention. In some embodiments, a plurality of instances of character manipulation program 300 can execute concurrently to generate elements of hard-negative text data based on differing set of information and/or dictates received from training data generation program 200.

In step 302, character manipulation program 300 identifies a set of rules. In one embodiment, character manipulation program 300 identifies a set of rules within rules 112 to utilize based on information received from training data generation program 200. In another embodiment, character manipulation program 300 analyzes the one or more dictates received from training data generation program 200 to identify a set of rules within rules 112 to utilize. In some embodiments, character manipulation program 300 identifies one or more subsequent rules or another set of rules in response to determining to generate another element of hard-negative training data (in decision step 309). For example, character manipulation program 300 may identify other sets of rules based on receiving multiple items of information from training data generation program 200, such as multiple language dictates or differing ranges of fonts sizes to include within negative training data corresponding to different typefaces.

In step 304, character manipulation program 300 determines a set of effects utilized to modify a character. In one embodiment, character manipulation program 300 determines a set of effects utilized to modify a character based on information included within the set of rules identified or dictated within step 302. In some embodiments, character manipulation program 300 determines that a set of rules indicates one or more randomization criteria, such as selecting differing effects from a list of effects for one or more characters that are modified, or a rule that includes a selections of rules and/or logical criteria that trigger when one or more effects are applied to a character. For example, if character manipulation program 300 receives a language dictate that excludes characters from a give language or alphabet from manipulation and character manipulation program 300 selects a character in step 308 that matches the dictate, then character manipulation program 300 skips applying effects to the character.

In another embodiment, if character manipulation program 300 determines that the set of rules identified within step 302 does not include a list effects to use to modify a character, then character manipulation program 300 identifies a random selection of effects to apply to a character based on policies included in rules 112, one or more dictates received from training data generation program 200, and the capabilities of graphics program 116. For example, character manipulation program 300 determines that training data generation program 200 dictates a set of languages to select from among, and a size of training data tiles to generate. Based on the size of the training data tiles, character manipulation program 300 selects a random number of effects to apply in response to generating an element of hard-negative training data.

In step 306, character manipulation program 300 determines an order to apply a set of effects. In one embodiment, character manipulation program 300 determines an order to apply a set of effects based on information included within the set of rules identified in step 302. For example, character manipulation program 300 determines that rule 1 included within rules 112 includes a set of eight ordered steps (described in further detail with respect to FIG. 4).

In some embodiments, character manipulation program 300 determines an order to apply a set of effects based on interactions among two or more rules, dictates, criteria, logical conditions, etc. In other embodiments, character manipulation program 300 determines that, based on information, policies, etc., included within rules 112, steps within one or more rules area are applied or executed in a random order (i.e., sequence).

In step 308, character manipulation program 300 generates an element of hard-negative training data. In various scenarios, character manipulation program 300 first selects a character to manipulate based on one or more dictates and/or items included within rules 112, such as utilizing three to five instances of each character respectively associated with a language of a dictated set of languages. In other scenarios, character manipulation program 300 randomly selects a character from among a plurality of characters based on one or more constraints or dictates, such as selecting characters from among Latin-based alphabets or a list of fonts. Character manipulation program 300 may select characters included within character library 124 and/or instruct font program 114 to render a selected character. In addition, if a character is not available in a dictated font, then character manipulation program 300 instruct font program 114 to render a selected character based on the dictated font.

In various embodiments, character manipulation program 300 modifies the selected character utilizing graphics program 116 based on a set of rules and effects determined in step 302 and step 304. In some embodiments, character manipulation program 300 is constrained to apply the identified character-modifying effects based on an order determined in step 306. Character manipulation program 300 can also store a one or more segments created while generating an element of hard-negative training data within segment library 126.

Still referring to step 308, in a further embodiment, character manipulation program 300 generates an element of hard-negative training data by selecting a group of segments (e.g., a random number of segments or a dictated number of segments) from segment library 126. Character manipulation program 300 may also apply one or more effects to a segment, such as mirroring the segment, translating the segment, etc. Character manipulation program 300 instructs graphics program 116 to place the group of selected segments within a tile of a dictated size and trim/fill around the segments within the tile as needed. Graphics program 116 renders the features within the tile generating an element of hard-negative training data.

In decision step 309, character manipulation program 300 determines whether to generate another element of hard-negative training data. In one embodiment, character manipulation program 300 determines to create another element of hard-negative training data based on determining that the number of generated elements (e.g., tiles) of hard-negative training data is less than a first dictate, such as the number of elements in an array of negative training data. In another embodiment, character manipulation program 300 determines to create another element of hard-negative training data based on determining that the number a first dictate is satisfied but at least a second dictate is not satisfied, such as generating another array of negative training data based on another language of a dictated set of languages, a different range of font sizes, or a different dictated font. In some embodiments, character manipulation program 300 determines to create additional elements of hard-negative training data based on information received from training data generation program 200.

Responsive to generate another element of hard-negative training data (Yes branch, decision step 309), character manipulation program 300 loops to step 302 to identify another set of rules related to generating one or more elements of hard-negative training data. In some embodiments, if character manipulation program 300 initially determines that a set or array of tiles of hard-negative are generated utilizing the same rules, effects, and order of effects, then character manipulation program 300 skips to step 308 to generate another element of hard-negative training data based on another dictate or other information received from training data generation program 200.

Referring to decision step 309, responsive to determining not to generate another element of hard-negative training data (No branch, decision step 309), character manipulation program 300 terminates.

Figure 4:
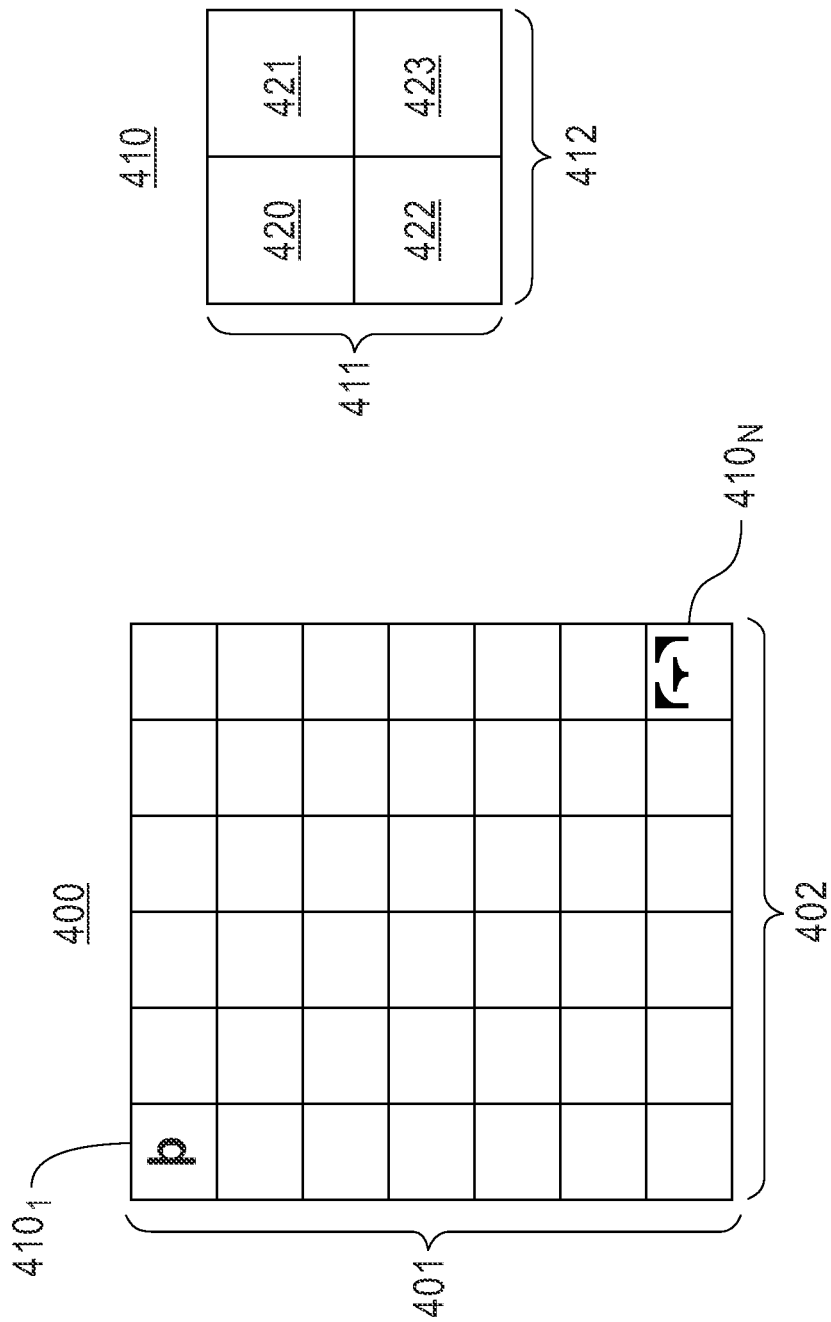
FIG. 4 is a generalized example of generating negative training data, in accordance with an embodiment of the present invention.

FIG. 4 is an illustrative example associated with various aspects generating a set of hard-negative training data, in accordance with embodiments of the present invention. In an embodiment, FIG. 4 depicts a set of negative training data represented by array 400. Array 400 further includes a plurality of hard-negative data (i.e., R-negative tiles) represented by tile $410_1$ through tile $410_N$. Tile $410_1$ and tile $410_N$ depict an element of hard-negative training data.

In an illustrative embodiment, training data generation program 200 dictates a size of array 400, which includes a height value of item 401 (e.g., six tiles) and a width value of item 402 (e.g., seven tiles). In an illustrative embodiment, training data generation program 200 also dictates that the plurality of tiles of array 400 (i.e., tiles $410_1$ through $410_N$) are a uniform size.

Example tile 410 depicts the tile size dictated training data generation program 200 to character manipulation program 300 for generating tiles of negative training data. Item 411 indicates the dictated height value and item 412 indicates the dictated width value of the plurality of tiles of array 400. The size values of item 411 and item 412 may be expressed as an integer number of pixels.

In the illustrative embodiment, example tile 410 is depicted as being partitioned into a sub-array of four segments (i.e., segments 420, 421, 422, and 423) of the same size. In different illustrative embodiment (not shown), tile $410_N$ was partitioned into a sub-array of segments of a width value of item 412 and a height value of item 411 divided by five.

In an example embodiment, character manipulation program 300 determines that training data generation program 200 dictates manipulating English language characters and that each tile of array 400 is modified by one or two pairs of dictated rules within rules 112, such as rule 1 and rule 2, or rule 2 and rule 3 (not shown).

In the illustrative example, character manipulation program 300 determines that rule 1 of rules 112 includes the ordered steps of: 1) select a random character without constraints, 2) select a font, 3) render the character within a tile of a random size range and the selected font, 4) partition the tile into a sub-array of equal quadrants, 5) divide (e.g., split) the rendered character based on the edges of respective quadrants, 6) retain two to five crops from the rendered character, 7) apply a random rotation and scaling to each retained crop, and 8) trim or fill around each crop to fit within a respective quadrant. Rule 2 of rules 112 includes a group of policies that include: 1) select a random character from character library 124, and 2) if the selected character is from a language different from a dictated language, then constrain (e.g., limit) modifying the selected character to one or more effects selected from the group consisting of rotating the character, mirroring the character, and translating the character within the area of a tile. Rule 3 of rules 112 includes the steps of: 1) select a font and render the character within a tile, 2) randomly rotate the character, 3) partition the tile and the included character into a sub-array one segment wide and three to six segments high, 4) delete two segments, one of which includes at least portion of the selected character, and 5) insert two blank segments at random.

In response to generating a first tile, (i.e., tile $410_1$), character manipulation program 300 utilizes rule 1 and rule 2. Because of the language dictate received from training data generation program 200, character manipulation program 300 determines that rule 2 has priority over and rule 1. In the illustrative example, character manipulation program 300 randomly selects a character from character library 124 (rule 2, step 1) producing a copy of the Icelandic character thorn; therefore, character manipulation program 300 determines that rule 1 is not utilized with respect further manipulation associated with tile $410_1$. Subsequently, character manipulation program 300 utilizes step 2 of rule 2 and determines to apply a mirror effect to thorn character. Character manipulation program 300 instructs graphics program 116 to mirror thorn character about the x-axis through the center of tile $410_1$ and then render tile $410_1$.

In another example embodiment, character manipulation program 300 determines to generate tile $410_N$ utilizing rule 2 and rule 3. In response to character manipulation program 300 selecting an English capital letter "E" character from character library 124 (rule 2, step 1), character manipulation program 300 instructs font program 114 to render the character "E" within tile $410_N$ based on a serif-based font (rule 3, step 1). Next, character manipulation program 300 determines a rotation value and instructs graphics program 116 to rotate the "E" character 90-degrees counter-clockwise within tile $410_N$. Character manipulation program 300 further determines to partition tile $410_N$ into a 1×5 sub-array (rule 3, step 3).

Responsive to determining to partition tile $410_N$ into a 1×5 sub-array, character manipulation program 300 instructs graphics program 116 to divide the rotated "E" character based on the edges of the five sub-array segments within tile $410_N$. Portions (e.g., features) of the rotated "E" character are present within segments 2, 3, and 4 (not shown). Next, character manipulation program 300 determines to instruct graphics program 116 to delete two segments (rule 3, step 4); segment 2 that includes the vertical stroke of the "E" character and segment 5, which is a featureless segment. In addition, character manipulation program 300 determines to instructs graphics program 116 to add two blank segments (rule 3, step 4) at the position of deleted segment 2, which translates the remaining features of the rotated "E" character towards the top of tile $410_N$ generating the depicted hard-negative training data element.

Figure 5:
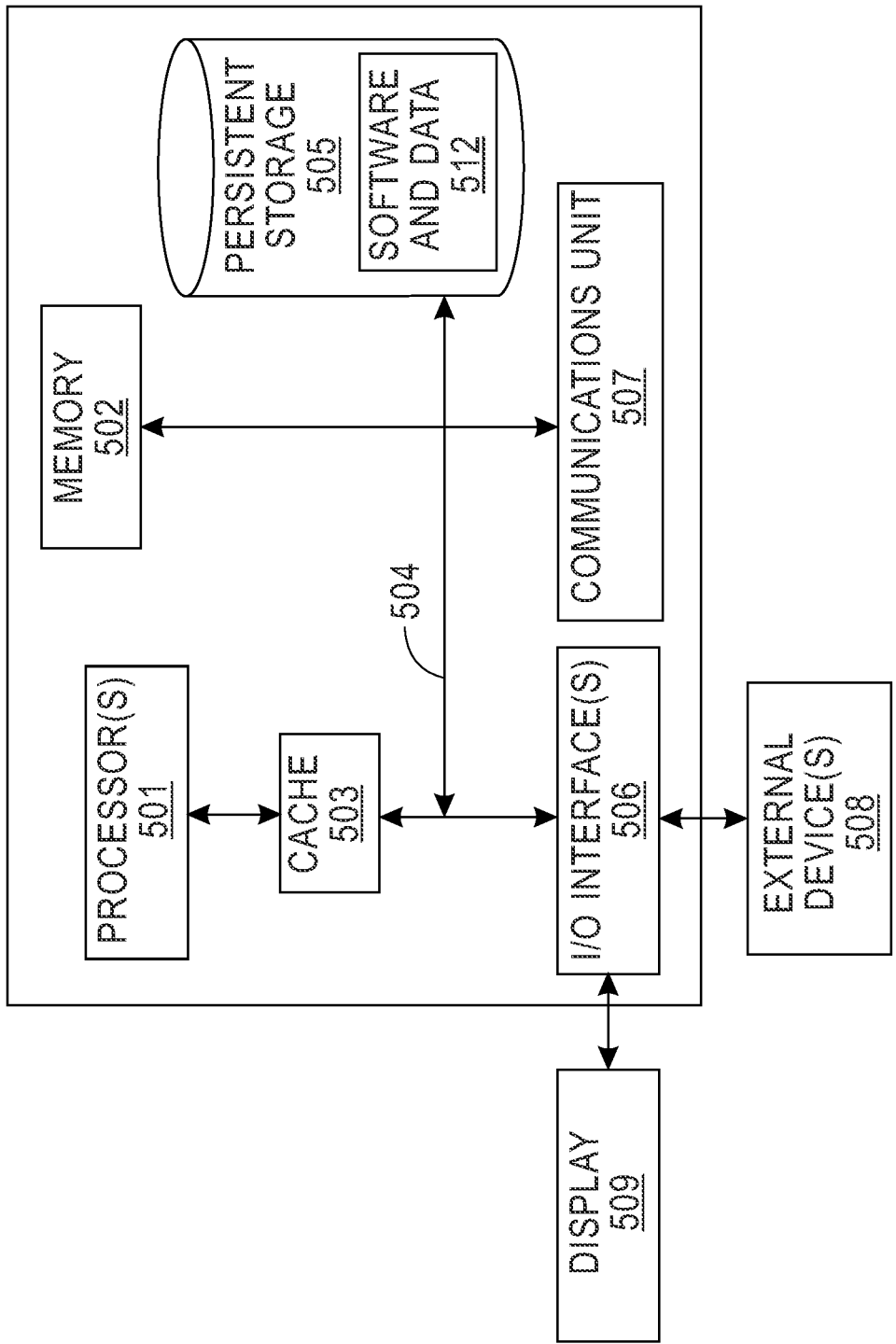
FIG. 5 is a block diagram of components of a computer, in accordance with an embodiment of the present invention.

FIG. 5 depicts computer system 500, which is representative system 110, repository 120, and system 130. Computer system 500 is an example of a system that includes software and data 512. Computer system 500 includes processor(s) 501, cache 503, memory 502, persistent storage 505, communications unit 507, input/output (I/O) interface (s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random-access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to system 110, software and data 512 includes rules 112, font program 114, graphics program 116, training data generation program 200, character manipulation program 300, and other programs and data (not shown). With respect to instances of repository 120, software and data 512 includes negative training data 122, character library 124, segment library 126, and other programs and data (not shown). With respect to system 130, software and data 512 includes machine learning program 132, documents 133, document metadata 134, and other data and programs (not shown).

Communications unit 507 provides for communications with other data processing systems or devices, including resources of system 110, repository 120, and system 130. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone. Alternatively, display 509 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, a set of dictates associated with generating one or more negative training datasets for training a set of models to classify a plurality of features found within a data source;
   identifying, by one or more computer processors, a set of rules related to generating negative training data to detect text based on the received set of dictates;
   compiling, by one or more computer processors, one or more arrays of elements of hard-negative training data into a negative training data dataset based on the identified set of rules and one or more dictates, an element of the hard-negative training data generated based on a character corresponding to a language and an identified first rule, further comprising:
      selecting, by one or more computer processors, a random character;
      rendering, by one or more computer processors, the selected character within a tile of a dictated size;
      partitioning, by one or more computer processors, the tile into two or more segments, wherein at least one segment of the two or more segments includes a portion of the rendered character; and
      modifying, by one or more computer processors, a portion of the rendered character included within a respective segment utilizing one or more effects; and
   determining, by one or more computer processors, metadata corresponding an array of elements of hard-negative training data.

2. The method of claim 1, wherein a set of dictates associated with generating a negative training dataset includes one or more elements selected from the group consisting of a set of rules to generate a hard-negative element of negative training data, a size associated with one or more arrays of elements of hard-negative training data, and characters corresponding to a language to be classified as not-text.

3. The method of claim 1, further comprising:
   training, by one or more computer processors, one or more models to classify a feature identified within the data source as not-text based on one or more compiled datasets of negative training data.

4. The method of claim 1, wherein the one or more effects that modify the portion of the rendered character within the respective segment are selected from the group consisting of applying a random rotation, applying a translation, applying a scaling factor to the portion of the rendered character within the respective segment.

5. The method of claim 1, further comprising:
   determining, by one or more computer processors, whether a modified portion of the rendered character extends beyond a boundary of the respective segment; and
   responsive to determining that the modified portion of the rendered character extends beyond one or more boundaries of the respective segment, trimming, by one or more computer processors, the modified portion of the rendered character based on boundaries of the respective segment.

6. A computer program product comprising:
   one or more computer readable storage media and program instructions stored on the one or more computer readable storage media, the program instructions readable/executable by one or more computer processors:
      program instructions to receive a set of dictates associated with generating one or more negative training datasets for training a set of models to classify a plurality of features found within a data source;
      program instructions to identify a set of rules related to generating negative training data to detect text based on the received set of dictates;
      program instructions to compile one or more arrays of elements of hard-negative training data into a negative training data dataset based on the identified set of rules and one or more dictates, an element of the hard-negative training data generated based on a character corresponding to a language and an identified first rule, further comprising:
         program instructions to select a random character;
         program instructions to render the selected character within a tile of a dictated size;
         program instructions to partition the tile into two or more segments, wherein at least one segment of the two or more segments includes a portion of the rendered character; and
         program instructions to modify a portion of the rendered character included within a respective segment utilizing one or more effects; and
      program instructions to determine metadata corresponding an array of elements of hard-negative training data.

7. The computer program product of claim 6, wherein a set of dictates associated with generating a negative training dataset includes one or more elements selected from the group consisting of a set of rules to generate a hard-negative element of negative training data, a size associated with one or more arrays of elements of hard-negative training data, and characters corresponding to a language to be classified as not-text.

8. The computer program product of claim 6, further comprising:

program instructions to train one or more models to classify a feature identified within the data source as not-text based on one or more compiled datasets of negative training data.

9. The computer program product of claim 6, wherein the one or more effects that modify the portion of the rendered character within the respective segment are selected from the group consisting of applying a random rotation, applying a translation, applying a scaling factor to the portion of the rendered character within the respective segment.

10. The computer program product of claim 6, further comprising:
program instructions determine whether a modified portion of the rendered character extends beyond a boundary of the respective segment; and
responsive to determining that the modified portion of the rendered character extends beyond one or more boundaries of the respective segment, program instructions to trim the modified portion of the rendered character based on boundaries of the respective segment.

11. A computer system comprising:
one or more computer processors;
one or more computer readable storage media; and
program instructions stored on the computer readable storage media for execution by at least one of the one or more computer processors, the program instructions comprising:
program instructions to receive a set of dictates associated with generating one or more negative training datasets for training a set of models to classify a plurality of features found within a data source;
program instructions to identify a set of rules related to generating negative training data to detect text based on the received set of dictates;
program instructions to compile one or more arrays of elements of hard-negative training data into a negative training data dataset based on the identified set of rules and one or more dictates, an element of the hard-negative training data generated based on a character corresponding to a language and an identified first rule, further comprising:
program instructions to select a random character;
program instructions to render the selected character within a tile of a dictated size;
program instructions to partition the tile into two or more segments, wherein at least one segment of the two or more segments includes a portion of the rendered character; and
program instructions to modify a portion of the rendered character included within a respective segment utilizing one or more effects; and
program instructions to determine metadata corresponding an array of elements of hard-negative training data.

12. The computer system of claim 11, wherein a set of dictates associated with generating a negative training dataset includes one or more elements selected from the group consisting of a set of rules to generate a hard-negative element of negative training data, a size associated with one or more arrays of elements of hard-negative training data, and characters corresponding to a language to be classified as not-text.

13. The computer system of claim 11, further comprising:
program instructions to train one or more models to classify a feature identified within the data source as not-text based on one or more compiled datasets of negative training data.

14. The computer system of claim 11, wherein the one or more effects that modify the portion of the rendered character within the respective segment are selected from the group consisting of applying a random rotation, applying a translation, applying a scaling factor to the portion of the rendered character within the respective segment.

* * * * *